United States Patent
Martin et al.

[11] Patent Number: 6,019,597
[45] Date of Patent: Feb. 1, 2000

[54] PROCESS FOR MINIMIZING CONDENSIBLES IN PROCESS STREAMS TREATED BY THERMAL OXIDIZERS

[76] Inventors: Gary Lee Martin, Upland; Joseph David Chiles, Rancho Cucamonga, both of Calif.

[21] Appl. No.: 08/914,622

[22] Filed: Aug. 19, 1997

Related U.S. Application Data

[63] Continuation-in-part of application No. 08/700,077, Aug. 20, 1996.

[51] Int. Cl.[7] .................................................... F27D 17/00

[52] U.S. Cl. .......................................... 432/181; 432/179

[58] Field of Search .................................. 432/179, 180, 432/181

[56] References Cited

U.S. PATENT DOCUMENTS

| | | | |
|---|---|---|---|
| 4,812,117 | 3/1989 | Granstrom | 432/180 |
| 5,026,277 | 6/1991 | York | 432/180 |
| 5,352,115 | 10/1994 | Klobucar | 432/181 |
| 5,538,420 | 7/1996 | Klobucar et al. | 432/180 |
| 5,589,142 | 12/1996 | Gribbon | 432/180 |

*Primary Examiner*—Teresa Walberg
*Assistant Examiner*—Gregory A. Wilson

[57] ABSTRACT

A method for processing an air stream using a thermal oxidizer, by pre-heating the air stream, without the use of auxiliary heat, and substantially eliminating the condensation of organic or inorganic compounds within the air stream to be treated. Alternatively, or in combination, the system used for this pre-heat method can also be used to accommodate intermittent higher volumes of organic or inorganic compounds without the need for additional bypass hardware or any unnecessary waste of energy or capital costs.

9 Claims, 4 Drawing Sheets

PROCESS FOR MINIMIZING CONDENSIBLES IN PROCESS STREAMS TREATED BY THERMAL OXIDIZERS

The present invention is a continuation in part of application Ser. No. 08/700,077, which was filed on Aug. 20, 1996, and is hereby incorporated by reference.

BACKGROUND OF THE INVENTION

The present invention generally relates to a method for pre-treating process streams for use by thermal oxidizers. More specifically, the invention relates to a method for treating condensibles in such process streams.

Thermal oxidizers are sometimes required to process gas streams containing condensible compounds, which may be either organic or inorganic compounds. For example, pollutant streams containing volatile organic compounds (VOCs) from paint or other facilities may require cleaning prior to exhaust to the environment. Such thermal oxidizers include regenerative thermal oxidizers, recuperative thermal oxidizers, catalytic oxidizers and regenerative catalytic oxidizers. All of these oxidizers will be generically referred to here as "thermal oxidizers", and the principles of the present invention can be used with each type of oxidizer.

If condensible compounds within the process stream are permitted to collect as a liquid or solid in the process duct or in the thermal oxidizer, the oxidizer may run inefficiently or malfunction, and pluggages or fires can result. Also, if the compound is allowed to condense, the resulting liquid or particulant may become a pollutant that is difficult to cleanse. Thus, it is generally desirable to incinerate compounds in their gaseous state. This invention relates to methods for preventing this condensation from occurring when using thermal oxidizers.

Known prior art thermal oxidizers employ auxiliary heating (i.e., heating methods not using the thermal oxidizer itself) to prevent condensation of organic or inorganic compounds. This is inefficient, since heat from outside the system must be employed.

Alternatively, known prior art thermal oxidizers remove or trap condensibles by, for example, washing them out. This is also not desirable since it requires additional equipment and results in subsidiary waste streams which must also be treated.

It would therefore be advantageous to provide a more reliable and efficient thermal oxidizer which would eliminate or reduce the condensation of organic compounds with a process stream without relying solely upon auxiliary heat, and without generating additional waste streams.

It would also be advantageous to provide a system which both prevents the condensation of VOC's and properly oxidizes intermittent high-VOC-concentration process streams. Currently available thermal oxidizer configurations require by-pass hardware when encountering such process streams. This results in a greater loss of thermal energy to the exhaust stack and greater capital costs (i.e., larger and more expensive blowers or fans). Also, previous designs for regenerative thermal oxidizers required the use of additional preheating hardware as well as a hot damper and by-pass duct work for the high temperature control system used to handle higher VOC concentrations. Alternatively, it would be desirable to employ a treatment system for intermittent high-VOC-concentration process streams which operates independently of a condensation minimization system.

SUMMARY OF THE INVENTION

The present invention provides these and other advantages while preserving the advantages of conventional thermal oxidizers. The present invention also provides new advantages not found with currently available thermal oxidizers, and overcomes many of the disadvantages of such equipment.

The invention is generally directed to a method for processing one or more air streams containing pollutants using a thermal oxidizer employing an oxidation chamber. In one preferred method of the present invention, ambient air is mixed with a heated air stream from the oxidation chamber to form an intermediate air stream. This intermediate air stream is then mixed with an air stream to be processed prior to sending it into the heat exchange section of the oxidizer. The resulting air stream mixture is thereby heated to a temperature sufficient to substantially eliminate the condensation of organic compounds within it.

Those of ordinary skill in the art will also appreciate that this configuration can accommodate a novel method for treating intermittent high-VOC-concentration process streams without the need for additional hardware. The present configuration can accommodate an intermittent high concentration of VOC's by lowering the thermal efficiency of the oxidizer. This is accomplished by introducing a greater volume of ambient air and heated air from the oxidation chamber than would otherwise be required to treat the normal or preselected range of VOC's for this configuration. This "larger" volume of intermediate air flows into the process stream containing a higher VOC concentration. The resulting increased process stream flow rate derates the thermal efficiency of the heat exchange section of the oxidizer, both by moving a larger volume of process stream gases and by limiting the amount of heated gases flowing directly from the oxidation chamber to the heat exchange section of the oxidizer. Thus, the heat exchange portion of the oxidizer becomes less efficient in heating the combined process stream as it flows into the heat exchanger portion of the oxidizer.

Of course, the intermittent high VOC concentration treatment feature of this system could be used independent of any preheat system. In such an alternative application, retention chamber gases would be bypassed or rerouted away from the exchanger bed so as to accomplish the derating of the heat exchanger.

In a second preferred embodiment, also directed to a method for processing one or more air streams containing pollutants using a thermal oxidizer employing an oxidation chamber, a heat exchanger is provided that is in heat exchange relationship with an inlet air stream to be processed by the thermal oxidizer. A heated outlet air stream from the thermal oxidizer is passed through the heat exchanger to thereby heat the inlet air stream to a temperature sufficient to substantially eliminate the condensation of organic or inorganic compounds within it. The heated inlet air stream is then conveyed to the thermal oxidizer for processing.

In a third preferred embodiment, the outlet gases from a thermal oxidizer are used to heat the incoming gases to be treated. This is done by designing a duct within a duct, so that the hot outlet gases flow past, and in heat exchange relationship with, the incoming process gases. To accomplish this, a concentric-type heat exchanger is preferably employed. In this fashion, the inlet air stream is heated to a temperature sufficient to substantially eliminate the condensation of organic or inorganic compounds present within the air stream.

BRIEF DESCRIPTION OF THE DRAWINGS

The novel features which are characteristic of the present invention are set forth in the appended claims. The invention itself, however, together with further objects and attendant advantages, will be best understood by reference to the following description taken in connection with the accompanying drawings in which:

DETAILED DESCRIPTION OF THE PREFERRED EMBODIMENTS

The preferred embodiments of the present invention will be described with respect to the use of the invention with a regenerative thermal oxidizer (RTO). RTOs are known for oxidizing pollutants, such as hydrocarbon vapors in air. In a conventional RTO, a pollutant-laden "dirty" gas to be cleaned is directed into a combustion chamber to be oxidized and burned (typically at temperatures in excess of 1500° F.); the oxidized gas is then directed out of the combustion chamber and through a "cooling" (previously heated) second regenerative heat exchanger. By alternating the flow of cool gas to be cleaned through a hot heat exchanger, and moving the hot cleaned gas from the combustion chamber and through a "cooled" heat exchanger, an RTO can continuously operate to efficiently oxidize pollutant-laden gases. Examples of such RTOs are shown in U.S. Pat. Nos. 5,026,277 and 5,352,115, the disclosures of which are incorporated herein by reference. It should be understood, however, that the benefits of the present invention can also be applied to other thermal oxidizers, such as recuperative thermal oxidizers, catalytic oxidizers, and regenerative catalytic oxidizers.

In each of the embodiments described in FIGS. 1–7, the thermal oxidizer, generally designated as 5, includes a heat exchanger section 10, a retention chamber 20 (also known as a combustion or oxidation chamber), and an induced draft fan 30 and associated duct work for directing the air streams. (Either induced draft ("ID") or forced draft fans can be used, for example.)

Figure 1:
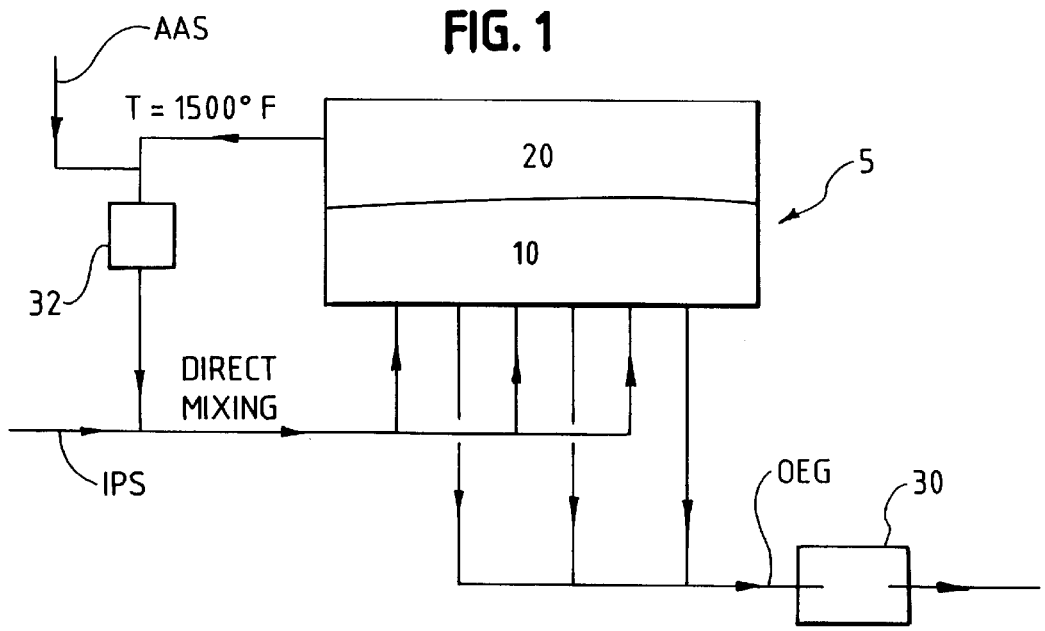
FIGS. 1–2 are schematic and an example schematic mass flow equation, respectively for the first preferred embodiment of the present invention using direct mixing preheating.
Figure 2:
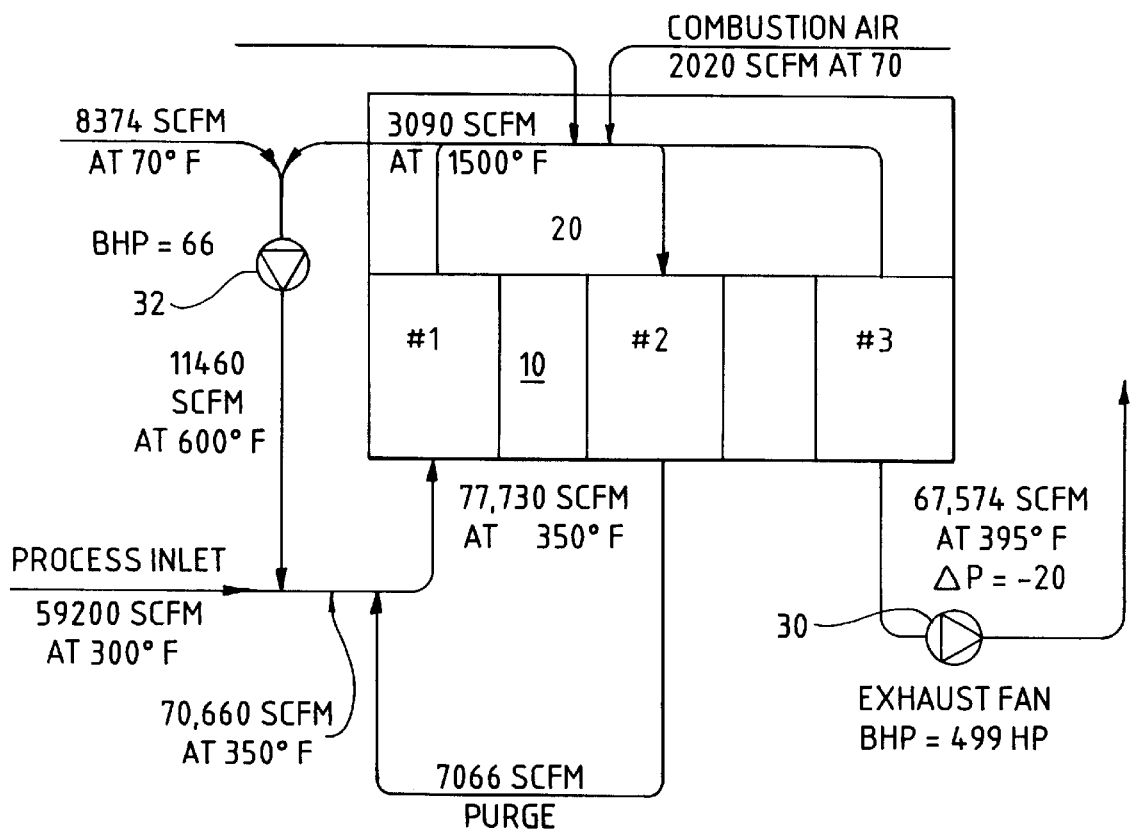

Referring now to FIGS. 1–2, one method of the present invention employs heated air from oxidation chamber 20 of RTO 5. This air is cooled by contact with ambient air stream AAS, and the resulting warm air is then introduced to inlet process stream (IPS) through fan 32, heating the IPS to a temperature sufficient to substantially eliminate the condensation of organic or inorganic compounds present within the air stream, prior to directing it into the RTO.

As with the other preferred embodiments of this invention, this configuration is also designed to treat process streams having intermittent higher concentrations of VOC's. Those of ordinary skill will understand that "intermittent higher concentrations of VOC's" simply refers to periodic inlet process streams having a concentration of pollutants above the point or range of pollutants for which a particular configuration is designed. The particular point or range of pollutants for a particular design will vary according to the needs of the user, and will be preselected based upon a variety of factors apparent to those of ordinary skill in the art. In treating intermittent high-VOC-concentrations, it is desirable to lower the thermal efficiency of the heat exchanger bed 10 in the thermal oxidizer 5. This is accomplished by lowering the control set point for the fan 32 that draws the ambient air stream and retention changer gases towards the inlet process stream. Of course, the standard and lowered control set points of the fan 32 will vary depending upon the flow rates and temperatures of the streams being processed, although optimization of such points for a particular thermal oxidation system can be accomplished by those of ordinary skill in the art. The resulting increased air flow into the heat exchanger section 10 thus derates its thermal efficiency. The thermal efficiency of the heat exchanger 10 is further decreased because the increased removal of heated gases from the retention chamber 20 prior to mixture of the heated air supply and the inlet process stream in heat exchanger section 10 thus decreases the supply of thermal energy to the heat exchanger bed section 10. The dual capacity (i.e., the preheat and intermittent high VOC concentration treatment features) of this configuration has a further benefit in that the heated air stream that is mixed with the ambient air does not have to be mixed with outlet exhaust gases from the thermal oxidizer. The exhaust gases stream would therefore not be as hot or as voluminous as comparable systems in the prior art. Thus, the induced draft blower or fan 30 used for the outlet exhaust gas stream would not have to be as large or have as high a temperature rating as those required in the prior art. An example mass flow of this first preferred embodiment is shown in FIG. 2. This figure also discloses the use of a purge stream from the heat exchanger 10 of a regenerative thermal oxidizer 5.

This "heat boost" and "heat by-pass" dual configuration should find particularly advantageous use with Plywood/Veneer driers and similar processes.

Figure 3:
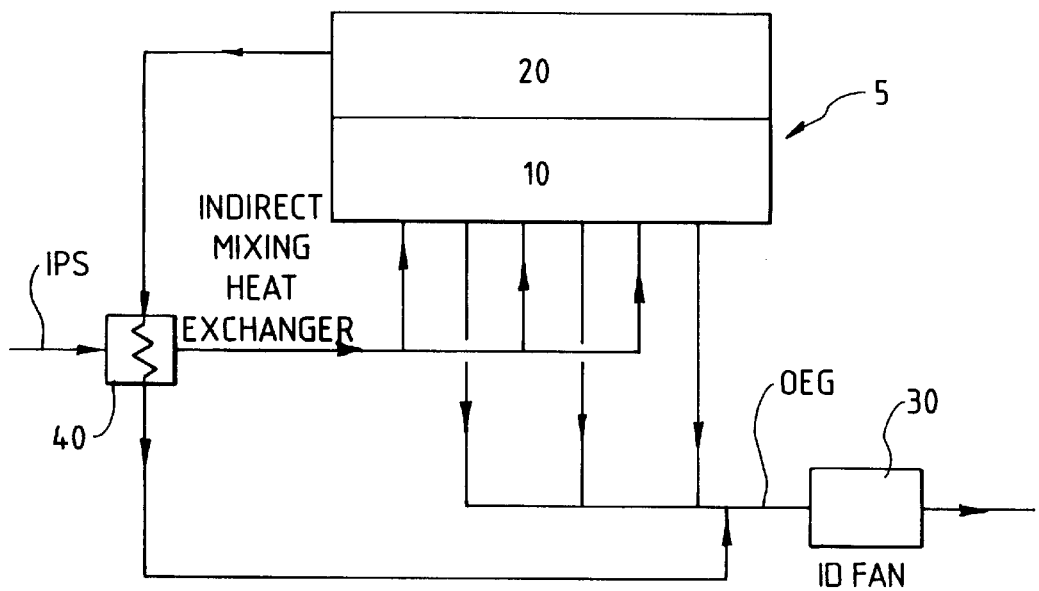
FIGS. 3–4 are schematic and an example schematic mass flow equation, respectively, for the second preferred embodiment of the present invention using heat exchanger preheating.
Figure 4:
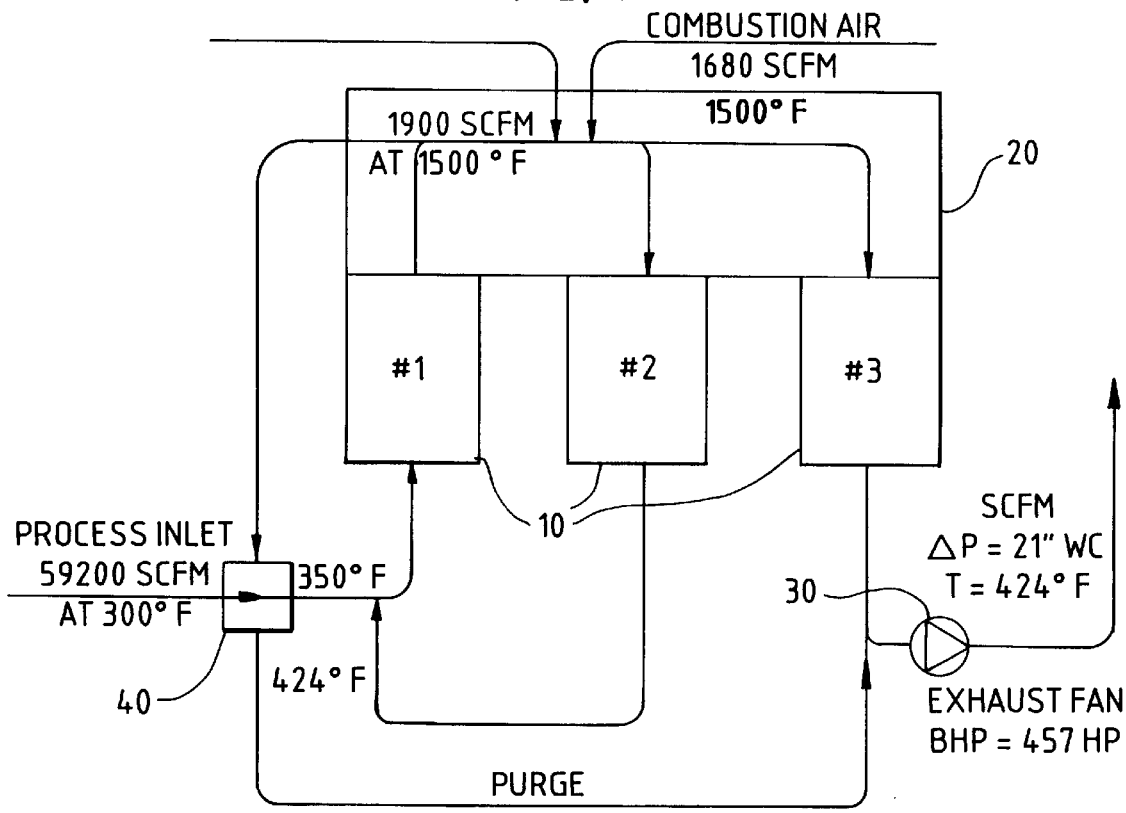

Referring now to FIGS. 3–4, in a second method of the present invention, air from oxidation chamber 20 of RTO 5 is passed through indirect mixing heat exchanger 40. Heat exchanger 40 is placed within the path of inlet process stream IPS, heating the IPS to a temperature sufficient to substantially eliminate the condensation of organic or inorganic compounds present within the air stream, prior to directing it into the RTO. Shown in FIG. 4 is an example mass flow equation for a regenerative thermal oxidizer employing the process of the present invention. This figure also shows purge flow path details for this preferred embodiment.

Figure 5:
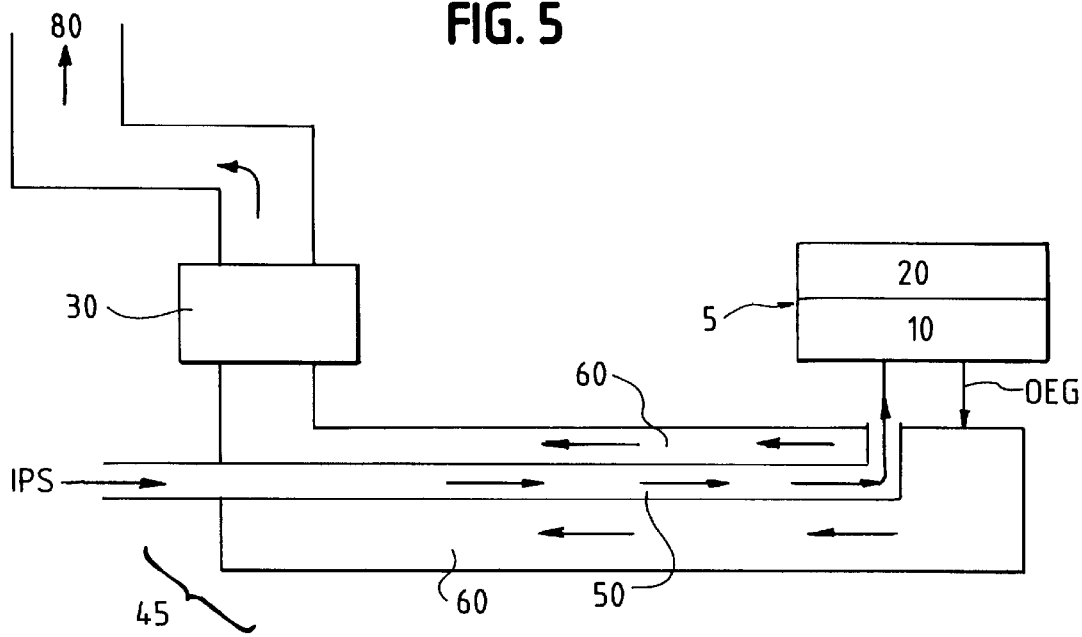
FIGS. 5–6 are schematic and an example schematic mass flow equation, respectively, for the first preferred embodiment of the present invention using duct-to-duct or concentric duct preheating.
Figure 6:
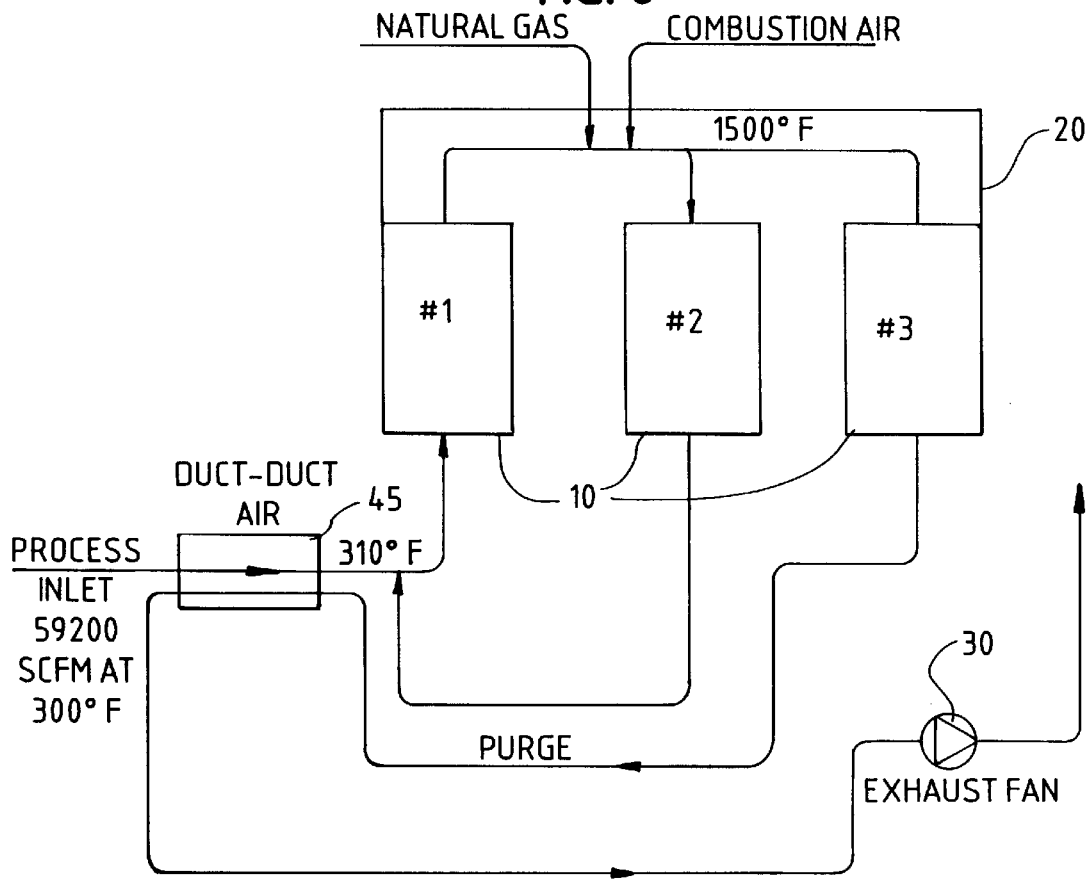

Referring now to FIGS. 5–6, in a third method of the present invention, the outlet exhaust gases (OEG) from RTO 5 are used to heat the inlet process stream (IPS) for the RTO. This is accomplished by employing a duct within a duct. The resulting heat exchanger, preferably in the form of a concentric-tube heat exchanger, as shown, is designated generally as 45. Thus, as the IPS travels through inlet duct 50 in the direction of the arrows, the OEG process streams traveling through outlet ducts 60 in the opposite direction are cooled; conversely, the IPS traveling through inlet duct 50 is indirectly heated by the OEG process streams. The OEG air streams from outlet ducts 60 are then blown by fan 30 to stack 80. Once again, the IPS is heated to a temperature sufficient to substantially eliminate the condensation of organic or inorganic compounds present within the air stream, prior to directing it into the RTO. It will be understood that this method improves the overall thermal efficiency of the oxidizer. An example of the mass flow using this configuration is disclosed in FIG. 6.

Figure 7:
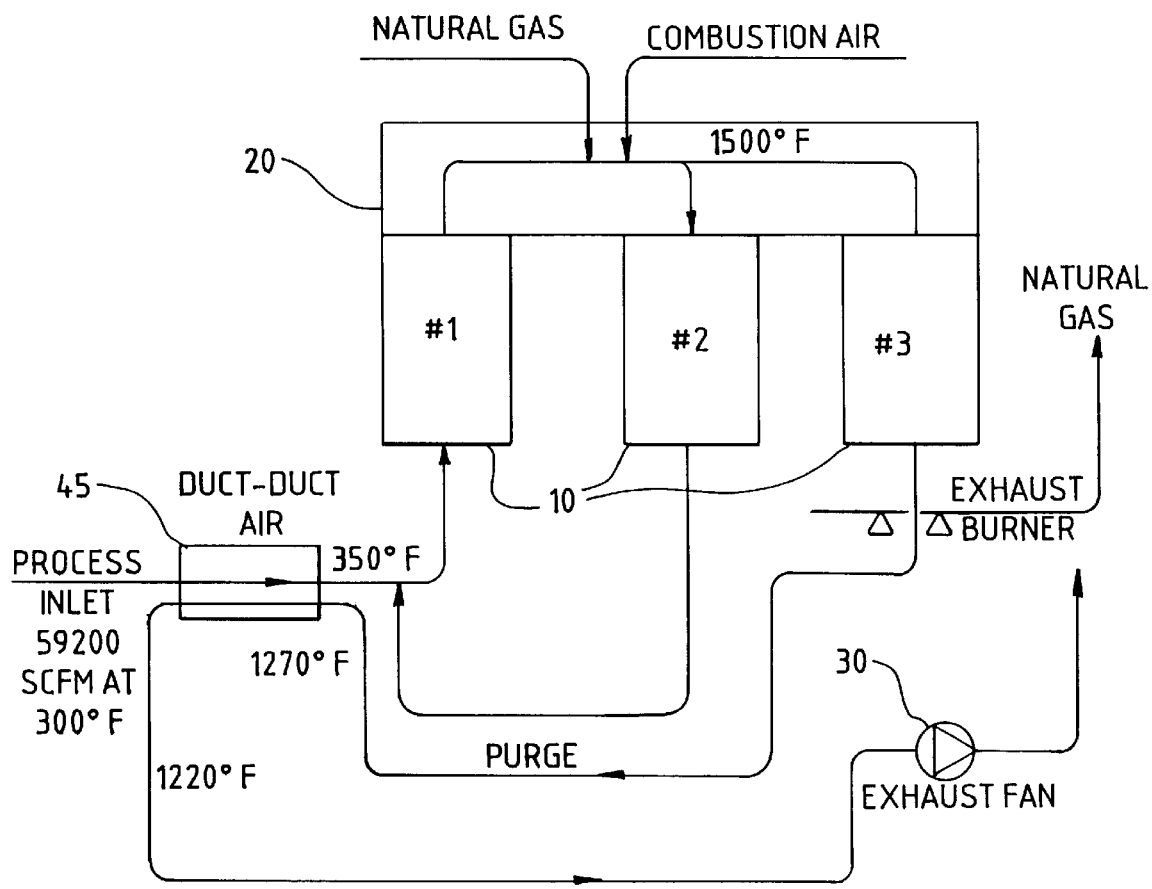
FIG. 7 is a schematic showing a variant of the third preferred embodiment using an exhaust burner for the outlet gas from the thermal oxidizer.

A further variant of this third embodiment is shown in FIG. 7, wherein the stream exiting heat exchanger 10 is heated by exhaust burner 90 prior to heating inlet process stream IPS in duct to duct heat exchanger 45. This variant has the additional benefit of an added heat boost for the inlet process stream as it passes through the duct to duct heat exchanger 45, thus further ensuring that no condensation of volatile organic compound occurs.

As used here, the phrase "temperature sufficient to substantially eliminate the condensation of organic or inorganic compounds" means a temperature which will eliminate or reduce the condensation of organic or inorganic compounds within an air stream to be processed, to a degree so that the thermal oxidizer will not malfunction or suffer material inefficiencies. Of course, this temperature may vary greatly, depending upon any number of variables such as the process stream volume, pressure, and composition, and the size, type and operating tolerances of the thermal oxidizer involved.

It will be understood that the invention may be embodied in other specific forms without departing from its spirit or central characteristics. For instance, the preheat feature of the present invention could be accomplished through the use of external heat sources, such as a natural gas burner or a steam coil. The preheat feature could likewise be used with a catalytic oxidizer, or any other type of thermal oxidizer. The present examples and embodiments, therefore, are to be considered in all respects as illustrative and not restrictive, and the invention is not to be limited to the details given here.

We claim:

1. A method for processing one or more air streams containing pollutants using a thermal oxidizer employing a heat exchanger section and an oxidation chamber, said air streams having a preselected range of pollutant concentration, said air streams also having intermittent concentration of pollutants higher than said preselected range of pollutant concentration, the method comprising the steps of:

mixing ambient air with a heated air stream from the oxidation chamber to form an intermediate air stream;

mixing the intermediate air stream with an inlet process stream prior to directing the resulting air stream into the thermal oxidizer, wherein the resulting air stream is heated to a temperature sufficient to substantially eliminate the condensation of organic or inorganic compounds within it; and;

when the inlet process stream has a concentration of pollutants higher than said preselected range of pollutant concentration mixing a greater volume of the intermediate air stream with the inlet process stream, wherein the resulting air stream decreases the thermal efficiency of the heat exchanger portion of the thermal oxidizer.

2. The method for processing one or more air streams of claim 1, wherein the additional volume of the intermediate air stream includes an additional volume of heated air stream from the combustion chamber, thereby further reducing the thermal efficiency of the heat exchanger portion of the thermal oxidizer.

3. The method for processing one or more air streams of claim 1, wherein the thermal oxidizer is a catalytic oxidizer.

4. The method of claim 1, further comprising heating said inlet air process stream with a steam coil prior to entering the thermal oxidizer.

5. The method of claim 1, further comprising heating said inlet air process stream with a natural gas burner prior to entering the thermal oxidizer.

6. The method of claim 1, further comprising heating said inlet air process stream with a heated outlet stream from the thermal oxidizer prior to said inlet air stream entering the thermal oxidizer.

7. A method for processing one or more air streams containing pollutants using a thermal oxidizer employing a heat exchanger section and an oxidation chamber, said air streams having a preselected range of pollutant concentration, said air stream having an intermittent concentration of pollutants higher than said preselected range, the method comprising the steps of:

supplying a heat source from said oxidation chamber to provide a heat exchange relationship with an inlet air stream to be processed by the thermal oxidizer;

conveying the heated inlet air stream to the thermal oxidizer, whereby the inlet air stream has been heated to a temperature sufficient to substantially eliminate the condensation of organic or inorganic compounds within it; and removing air from the oxidation chamber of the thermal oxidizer in response to an inlet process stream having a concentration of pollutants higher than said preselected range of pollutant concentration, wherein the removal of air from the oxidation chamber derates the thermal efficiency of the heat exchanger portion of the thermal oxidizer.

8. A method for processing one or more air streams containing pollutants using a thermal oxidizer employing a heat exchanger section and an oxidation chamber, said air streams having a preselected range of pollutant concentration, said air stream having an intermittent concentration of pollutants higher than said preselected range, the method comprising the steps of:

providing one or more inlet ducts for conveying an inlet air stream to be processed to the thermal oxidizer;

providing one or more outlet ducts for conveying the heated outlet gases from the thermal oxidizer after processing;

forming a heat exchanger using the inlet and outlet ducts;

heating the inlet air stream as it passes through the one or more inlet ducts, using heat from the outlet gas as it passes through the one or more outlet ducts, wherein the inlet air stream is heated to a temperature sufficient to substantially eliminate the condensation of organic compounds within it.

9. The method of claim 8, comprising the further step of heating said outlet gas with an exhaust burner exiting said thermal oxidizer prior to heating said inlet air stream.

* * * * *